Patented Dec. 3, 1940

2,223,446

UNITED STATES PATENT OFFICE 2,223,446

PROCESS OF VULCANIZING RUBBER AND PRODUCT OBTAINED THEREBY

Marion W. Harman, Nitro, W. Va., assignor to Monsanto Chemical Company, St. Louis, Mo., a corporation of Delaware No Drawing. Application March 25, 1938, Serial No. 198,112

22 Claims. (Cl. 260—787)

The present invention relates to a new class of rubber vulcanization accelerators and to the vulcanization of rubber by an improved process wherein there is employed a preferred class of compounds in the vulcanization process.

The new class of compounds have been found to accelerate the vulcanization of rubber and in consequence may be employed alone as an accelerator. In the preferred operation of the present invention, however, the new accelerators are employed in conjunction with other organic accelerators whereby rubber products exhibiting improved properties are obtained.

The new and preferred class of accelerators are the cyclohexylamine salts of fatty acids and preferably the cyclohexylamine salts of the higher fatty acids as for example cyclohexylamine oleate, cyclohexylamine stearate, dicyclohexylamine stearate, dimethyl cyclohexylamine oleate, dimethyl methyl cyclohexylamine oleate, cyclohexylamine laurate, cyclohexylamine phenyl stearate, methyl cyclohexylamine oleate, benzyl cyclohexylamine oleate, ethyl cyclohexylamine stearate, cyclohexylamine palmitate and cyclohexylamine myristate. Thus any substituted ammonia wherein at least one of the hydrogen atoms is replaced by a cyclohexyl or a substituted cyclohexyl group, reacted with a higher fatty acid to form a salt is within the scope of the present invention. In place of the fatty acids disclosed above, I may employ acetic acid, butyric acid, caproic acid, capyrlic acid, capric acid, margaric acid and arachidic acid.

The cyclohexylamine salts of fatty acids are readily obtainable by mixing the proper molecular proportions of the amine with the fatty acid. Where convenient or desirable, the reaction may be enhanced by the application of heat.

As a specific example of a typical preparation which is intended to illustrate the invention but not to limit the same, 28.4 parts by weight (0.1 molecular proportion) of stearic acid and 9.9 parts by weight (0.1 molecular proportion) of cyclohexylamine were melted together. A clear liquid was formed which solidified to a soapy white solid upon cooling and this product comprising the desired cyclohexylamine salt of stearic acid was incorporated in typical rubber stocks as hereinafter shown. In like manner cyclohexylamine oleate was prepared by mixing equimolecular proportions of oleic acid and cyclohexylamine. The reaction was exothermic and proceeded without the application of external heat. Other examples of the preferred class of materials are obtainable as described above and the compounds hereinafter employed as specific illustrations of the invention were so obtained. Where convenient or desirable other methods of preparation may be employed. Thus an organic solvent may be utilized as a reaction medium or other innovations introduced.

As a specific embodiment of the invention showing the use of the new class of materials as accelerators for the vulcanization of rubber but which is intended to illustrate and not to limit the invention, a rubber stock was compounded comprising

Stock A

| | Parts by weight |
|---|---|
| Smoked sheets | 100 |
| Zinc oxide | 10 |
| Sulfur | 3 |
| Stearic acid | 0.5 |
| Cyclohexylamine oleate | 3.0 |

The rubber stock so compounded was vulcanized at the temperature of twenty pounds steam pressure per square inch and the following modulus and tensile properties were obtained on testing the cured rubber product.

Table I

| Cure time in minutes | Stock | Modulus of elasticity in lbs./in.$^2$ at elongations of— | | Tensile at break in lbs./in.$^2$ | Ult. elong., percent |
|---|---|---|---|---|---|
| | | 500% | 700% | | |
| 30 | A | 85 | 145 | 725 | 1010 |
| 45 | A | 110 | 230 | 1025 | 860 |
| 60 | A | 170 | 460 | 1450 | 870 |
| 90 | A | 270 | 1060 | 1825 | 780 |

The above data show the accelerating properties of the preferred class of compounds. It is preferred, however, to employ them in conjunction with other organic accelerators whereby new and improved results in the vulcanization of rubber are obtained. Among the said new and improved results may be mentioned the valuable softening action possessed by the preferred compounds and by their use the rubber is rendered more plastic and it mills easier so that less power is consumed in the said milling operation. In addition the new compounds show a desirable activation of other organic accelerators when employed in conjunction therewith producing vulcanized rubber products of improved physical properties. In the preferred operation of the present invention the new class of compounds may be employed with any of the usual accelerators commonly employed in the vulcanization of rubber. For example the mercapto thiazole accelerators such as mercaptobenzothiazole, mercapto phenyl benzothiazole, mercapto naphtha thiazole, mercapto methyl thiazole, and mercapto methyl benzothiazole may be employed with the new accelerators of the present invention. It is meant to include by the term "mercapto thiazole" accelerators reaction products of mercapto thiazoles as well as the free mercapto thiazole. Further examples are the organic base reaction products of mercapto thiazoles exemplified by di(benzothiazyl thiol) dimethyl urea and cyclohexylamino thiol benzothiazole. Other reaction products of mercapto thiazoles have likewise been found applicable in the operation of the present invention as for example dinitro phenyl benzothiazyl sulfide, benzothiazyl thiol benzoate, and methylol thiol benzothiazole and likewise the thiazole sulfides such as dibenzothiazyl mono sulfide and dibenzothiazyl disulfide. In addition other types of accelerators than the mercapto thiazoles may be employed such as the dithiocarbamates and the aldehyde-amine accelerators, specific examples of which are sodium dimethyl dithiocarbamate, dimethyl thiuram disulfide, piperidine cyclopentamethylene dithiocarbamate, butylaldehyde-aniline, acetaldehyde-aniline and formaldehyde-aniline.

The following are examples of the preferred operation of the present invention showing the use of the new compounds in conjunction with other accelerators and are to be understood as specific embodiments of the invention and in nowise limitative.

As one specific embodiment of the present invention typical examples of cyclohexylamine salts of fatty acids were employed in conjunction with a mercapto thiazole accelerator. Rubber stocks were compounded comprising

| | Stocks, parts by weight | | | | | | |
|---|---|---|---|---|---|---|---|
| | B | C | D | E | F | G | H |
| Smoked sheets | 100 | 100 | 100 | 100 | 100 | 100 | 100 |
| Zinc oxide | 5 | 5 | 5 | 5 | 5 | 5 | 5 |
| Sulfur | 3 | 3 | 3 | 3 | 3 | 3 | 3 |
| Stearic acid | 0.5 | 0.5 | 0.5 | 0.5 | 0.5 | 0.5 | 0.5 |
| Mercaptobenzothiazole | 0.75 | 0.75 | 0.75 | 0.75 | 0.75 | 0.75 | 1.0 |
| Cyclohexylamine stearate | | 0.25 | | | | | |
| Cyclohexylamine laurate | | | 0.25 | | | | |
| Cyclohexylamine palmitate | | | | 0.25 | | | |
| Cyclohexylamine phenyl stearate | | | | | 0.25 | | |
| Methyl cyclohexylamine oleate | | | | | | 0.25 | |

The rubber stocks so compounded were vulcanized by heating in a press at the temperature of twenty pounds steam pressure per square inch and the modulus and tensile properties obtained on testing the cured rubber stocks are given in Table II.

Table II

| Cure time in minutes | Stock | Modulus of elasticity in lbs./in.$^2$ at elongations of— | | Tensile at break in lbs./in.$^2$ | Ult. elong., percent |
|---|---|---|---|---|---|
| | | 500% | 700% | | |
| 30 | B | 300 | 1090 | 2020 | 810 |
| 30 | C | 750 | 3100 | 3880 | 750 |
| 30 | D | 980 | 3485 | 4100 | 720 |
| 30 | E | 860 | 3095 | 4000 | 740 |
| 30 | F | 790 | 3075 | 3900 | 740 |
| 30 | G | 950 | 3460 | 4200 | 740 |
| 30 | H | 370 | 1325 | 2650 | 820 |
| 45 | B | 380 | 1350 | 2440 | 800 |
| 45 | C | 840 | 3335 | 4030 | 735 |
| 45 | D | 1080 | 3760 | 4650 | 735 |
| 45 | E | 905 | 3270 | 4125 | 735 |
| 45 | F | 870 | 3100 | 3850 | 740 |
| 45 | G | 1070 | 3915 | 3915 | 700 |
| 45 | H | 430 | 1650 | 2925 | 795 |
| 60 | B | 420 | 1650 | 2680 | 780 |
| 60 | C | 910 | 3450 | 3920 | 720 |
| 60 | D | 1030 | 3830 | 3830 | 700 |
| 60 | E | 945 | 3330 | 4180 | 740 |
| 60 | F | 900 | 3290 | 3900 | 725 |
| 60 | G | 1100 | 3950 | 3950 | 700 |
| 60 | H | 520 | 1790 | 2500 | 770 |

The above data show that the addition of a small amount of one of the preferred class of materials to a thiazole accelerator, for example mercaptobenzothiazole, gives a faster curing and a higher modulus and tensile stock. This is readily apparent upon comparing the B stock with the C, D, E, F and G stocks. A comparison of the H stock with the C, D, E, F and G stocks shows that when a portion of the thiazole accelerator is replaced by one of the preferred class of materials, the total accelerator being kept constant, the modulus and tensile properties of the stocks containing the preferred class of materials are again markedly higher than those of the stock containing only a thiazole accelerator.

Other cyclohexylamine fatty acids have been found to exhibit the desirable properties characteristic of the preferred class of materials. Primary, secondary and tertiary cyclohexylamine fatty acids have all been found to exhibit useful accelerating, activating and softening properties. For example a rubber stock was compounded comprising

Stock I

| | Parts by weight |
|---|---|
| Pale crepe | 100 |
| Sulfur | 3 |
| Zinc oxide | 5 |
| Stearic acid | 1 |
| Di(benzothiazyl thiol) dimethyl urea | 0.60 |
| Dimethyl cyclohexylamine oleate | 0.10 |

The rubber stock so compounded was vulcanized in a press at the temperature of twenty pounds steam pressure per square inch and the physical properties of the cured rubber product are given in Table III.

Table III

| Cure time in minutes | Stock | Modulus of elasticity in lbs./in.$^2$ at elongations of— | | Tensile at break in lbs./in.$^2$ | Ult. elong., percent |
|---|---|---|---|---|---|
| | | 500% | 700% | | |
| 30 | I | 200 | 670 | 2000 | 880 |
| 45 | I | 320 | 1240 | 2680 | 805 |
| 60 | I | 385 | 1610 | 2800 | 795 |
| 90 | I | 525 | 2160 | 3250 | 770 |

The above data show the desirable modulus and tensile properties obtained by the use of a tertiary cyclohexylamine fatty acid in conjunction with an organic base reaction product of a mercapto thiazole.

As further specific embodiments of the present invention showing further the use of the new and preferred class of compounds with organic base reaction products of mercapto thiazoles, rubber stocks were compound comprising

|  | Stocks, parts by weight | |
|---|---|---|
|  | J | K |
| Pale crepe | 100 | 100 |
| Zinc oxide | 8 | 8 |
| Sulfur | 2.5 | 2.5 |
| Stearic acid | 0.5 | 0.5 |
| Di(benzothiazyl thiol) dimethyl urea | 0.6 | 0.6 |
| Cyclohexylamine stearate | 0.05 |  |
| Cyclohexylamine oleate |  | 0.05 |

The rubber stocks so compounded were vulcanized by heating for different periods of time at the temperature of twenty pounds steam pressure per square inch and the modulus and tensile properties obtained on testing the cured rubber products are shown in Table IV.

Table IV

| Cure time in minutes | Stock | Modulus of elasticity in lbs./in.$^2$ at elongations of— | | Tensile at break in lbs./in.$^2$ | Ult. elong., percent |
|---|---|---|---|---|---|
| | | 500% | 700% | | |
| 30 | J | 165 | 437 | 1263 | 910 |
| 30 | K | 170 | 440 | 1570 | 965 |
| 45 | J | 237 | 783 | 1813 | 875 |
| 45 | K | 250 | 775 | 1680 | 850 |
| 60 | J | 325 | 1125 | 2300 | 845 |
| 60 | K | 287 | 1048 | 2210 | 845 |
| 75 | J | 393 | 1300 | 2700 | 835 |
| 75 | K | 344 | 1250 | 2610 | 850 |
| 90 | J | 405 | 1455 | 2745 | 820 |
| 90 | K | 393 | 1430 | 2815 | 830 |

The above data show the use of the preferred class of materials with organic base reaction products of mercapto thiazoles and the desirable modulus and tensile properties obtained thereby.

As a further specific embodiment of the present invention a rubber stock was compounded comprising

Stock L

|  | Parts by weight |
|---|---|
| Smoked sheets | 100 |
| Zinc oxide | 5 |
| Sulfur | 3 |
| Stearic acid | 0.50 |
| Cyclohexylamino thiol benzothiazole | 0.50 |
| Cyclohexylamine oleate | 0.25 |

The rubber stock so compounded was vulcanized in the usual manner at the temperature of twenty pounds steam pressure per square inch and the physical properties of the cured rubber product are shown in Table V.

Table V

| Cure time in minutes | Stock | Modulus of elasticity in lbs./in.$^2$ at elongations of— | | Tensile at break in lbs./in.$^2$ | Ult. elong., percent |
|---|---|---|---|---|---|
| | | 500% | 700% | | |
| 45 | L | 755 | 3300 | 3950 | 735 |
| 60 | L | 1070 | 4310 | 4600 | 715 |
| 90 | L | 1340 | 4760 | 4760 | 700 |

The above data show the desirable modulus and tensile properties obtained by the use of the preferred class of materials in conjunction with an organic base reaction product of a mercapto thiazole, for example cyclohexylamino thiobenzothiazole.

As a further specific embodiment of the invention a rubber stock was compounded comprising

Stock M

|  | Parts by weight |
|---|---|
| Smoked sheets | 100 |
| Zinc oxide | 5 |
| Whiting | 20 |
| Stearic acid | 1 |
| Sulfur | 2 |
| Methylol thiol benzothiazole | 1 |
| Cyclohexylamine oleate | 0.25 |

The rubber stock so compounded was vulcanized in the usual manner at the temperature of sixty pounds steam pressure per square inch and the following modulus and tensile properties obtained on testing the cured rubber product.

Table VI

| Cure time in minutes | Stock | Modulus of elasticity in lbs./in.$^2$ at elongations of— | | Tensile at break in lbs./in.$^2$ | Ult. elong., percent |
|---|---|---|---|---|---|
| | | 500% | 700% | | |
| 5 | M | 895 | 2820 | 3400 | 745 |
| 7 | M | 950 | 3050 | 3775 | 745 |
| 9 | M | 965 | 3075 | 3300 | 726 |

The above data show the accelerating properties of the preferred class of materials when employed in conjunction with the formaldehyde reaction product of a mercapto thiazole, for example mercaptobenzothiazole.

As a further specific embodiment of the invention showing the desirable properties of the preferred class of materials in a different rubber stock and with another accelerator, the following rubber stocks were compounded

|  | Stocks, parts by weight | |
|---|---|---|
|  | N | O |
| Smoked sheets | 100 | 100 |
| Zinc oxide | 4 | 4 |
| Non-reinforcing carbon black | 38 | 38 |
| Sulfur | 1.25 | 1.25 |
| Aniline-acetone condensation product treated with mineral acid | 1.0 | 1.0 |
| Benzothiazyl disulfide | 0.7 | 0.7 |
| Cyclohexylamine oleate | 1.0 |  |
| Dicyclohexylamine oleate |  | 1.0 |

The rubber stocks so compounded were vulcanized by heating for different periods of time at the temperature of sixty pounds steam pressure per square inch. The modulus and tensile properties of the cured rubber products are given in Table VII.

Table VII

| Cure time in minutes | Stock | Modulus of elasticity in lbs./in.$^2$ at elongations of— | | Tensile at break in lbs./in.$^2$ | Ult. elong., percent |
|---|---|---|---|---|---|
| | | 500% | 700% | | |
| 3 | N | 1070 | 3005 | 4180 | 805 |
| 3 | O | 768 | 2120 | 2505 | 750 |
| 5 | N | 1230 | 3370 | 4530 | 800 |
| 5 | O | 938 | 2630 | 3550 | 785 |
| 7 | N | 1190 | 3295 | 4305 | 785 |
| 7 | O | 1010 | 2810 | 3780 | 800 |
| 9 | N | 1195 | 3240 | 4140 | 780 |
| 9 | O | 957 | 2675 | 3710 | 805 |

The above data further show the use of the preferred class of compounds with mercapto thiazole accelerators and the desirable results obtained thereby.

As a further specific embodiment of the invention which is not intended to limit the invention but to illustrate the use of the preferred class of materials with yet another type of organic accelerator, rubber stocks were compounded comprising

|  | Stocks, parts by weight | |
| --- | --- | --- |
|  | P | Q |
| Smoked sheets | 100 | 100 |
| Zinc oxide | 5 | 5 |
| Sulfur | 3 | 3 |
| Stearic acid | 0.5 | 0.5 |
| Butylaldehyde-aniline condensation product | 0.375 | 0.375 |
| Cyclohexylamine oleate |  | 0.25 |

The rubber stocks so compounded were vulcanized in a press at the temperature of twenty pounds steam pressure per square inch and the following modulus and tensile properties obtained on testing the cured rubber products.

*Table VIII*

| Cure time in minutes | Stock | Modulus of elasticity in lbs./in.$^2$ at elongations of— | | Tensile at break in lbs./in.$^2$ | Ult. elong., percent |
| --- | --- | --- | --- | --- | --- |
|  |  | 500% | 700% |  |  |
| 30 | P | 245 | 1070 | 2400 | 860 |
| 30 | Q | 295 | 1390 | 2660 | 820 |
| 45 | P | 375 | 1690 | 2975 | 810 |
| 45 | Q | 450 | 2120 | 3000 | 760 |
| 60 | P | 510 | 2350 | 3500 | 790 |
| 60 | Q | 625 | 2800 | 3500 | 760 |
| 90 | P | 700 | 3000 | 3625 | 740 |
| 90 | Q | 775 | 3480 | 4025 | 733 |

The above data show the marked activation exhibited by the preferred class of materials when employed with aldehyde-amine accelerators.

The new and preferred class of materials may be employed with other accelerators than those specifically mentioned. This invention is not restricted to the use of the particular compounds given in the disclosure as examples, nor is it restricted to the use of the preferred class of compounds in the particular rubber mixes herein described. The invention is limited only by the claims attached hereto as part of the present specification.

What is claimed is:

1. The process of vulcanizing rubber which comprises heating rubber and sulfur in the presence of a primary cyclohexylamine salt of a fatty acid.

2. The process of vulcanizing rubber which comprises heating rubber and sulfur in the presence of a primary cyclohexylamine salt of a fatty acid wherein the fatty acid radical contains more than eleven but less than twenty-five carbon atoms.

3. The process of vulcanizing rubber which comprises heating rubber, sulfur and a primary cyclohexylamine salt of a fatty acid in the presence of an organic accelerator of a different class.

4. The process of vulcanizing rubber which comprises heating rubber, sulfur and a primary cyclohexylamine salt of a fatty acid wherein the fatty acid contains more than eleven but less than twenty-five carbon atoms in the presence of an organic accelerator of a different class.

5. The process of vulcanizing rubber which comprises heating rubber, sulfur and a mercapto thiazole accelerator in the presence of a primary cyclohexylamine salt of a fatty acid.

6. The process of vulcanizing rubber which comprises heating rubber and sulfur in the presence of cyclohexylamine oleate.

7. The process of vulcanizing rubber which comprises heating rubber, sulfur and a mercapto thiazole accelerator in the presence of cyclohexylamine oleate.

8. The process of vulcanizing rubber which comprises heating rubber and sulfur in the presence of a primary cyclohexylamine oleate.

9. The process of vulcanizing rubber which comprises heating rubber, sulfur and a mercapto thiazole accelerator in the presence of a primary cyclohexylamine oleate.

10. The process of vulcanizing rubber which comprises heating rubber and sulfur in the presence of cyclohexylamine stearate.

11. The process of vulcanizing rubber which comprises heating rubber, sulfur and a mercapto thiazole accelerator in the presence of cyclohexylamine stearate.

12. The rubber composition comprising rubber, sulfur and a primary cyclohexylamine salt of a fatty acid.

13. The rubber composition comprising rubber, sulfur and a primary cyclohexylamine salt of a fatty acid wherein the fatty acid radical contains more than eleven but less than twenty-five carbon atoms.

14. The rubber composition comprising rubber, sulfur a primary cyclohexylamine salt of a fatty acid and an organic accelerator of a different class.

15. The rubber composition comprising rubber, sulfur a primary cyclohexylamine salt of a fatty acid wherein the fatty acid contains more than eleven but less than twenty-five carbon atoms and an organic accelerator of a different class.

16. The rubber composition comprising rubber, sulfur a mercapto thiazole accelerator and a primary cyclohexylamine salt of a fatty acid.

17. The rubber composition comprising rubber, sulfur and cyclohexylamine oleate.

18. The rubber composition comprising rubber, sulfur a mercapto thiazole accelerator and cyclohexylamine oleate.

19. The rubber composition comprising rubber, sulfur and a primary cyclohexylamine oleate.

20. The rubber composition comprising rubber, sulfur a mercapto thiazole accelerator and a primary cyclohexylamine oleate.

21. The rubber composition comprising rubber, sulfur and cyclohexylamine stearate.

22. The rubber composition comprising rubber, sulfur a mercapto thiazole accelerator and cyclohexylamine stearate.

MARION W. HARMAN.